United States Patent
Gilliland et al.

(10) Patent No.: US 7,659,483 B2
(45) Date of Patent: Feb. 9, 2010

(54) ELECTROACTIVE POLYMER COMPRESSED GASKET FOR ELECTROMAGNETIC SHIELDING

(75) Inventors: Don A Gilliland, Rochester, MN (US); Sophia S. Lau, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 12/124,324

(22) Filed: May 21, 2008

(65) Prior Publication Data

US 2008/0217868 A1    Sep. 11, 2008

Related U.S. Application Data

(63) Continuation of application No. 11/470,828, filed on Sep. 7, 2006, now Pat. No. 7,456,365.

(51) Int. Cl.
*H05K 9/00* (2006.01)
(52) U.S. Cl. .......... 174/356; 174/364; 174/366; 277/646; 277/920
(58) Field of Classification Search .......... 174/356, 174/364, 366; 277/646, 919, 902, 921; 361/816, 361/818
See application file for complete search history.

(56) References Cited

U.S. PATENT DOCUMENTS

| | | | | |
|---|---|---|---|---|
| 4,177,353 A | * | 12/1979 | McCormack | 174/374 |
| 4,371,175 A | * | 2/1983 | Van Dyk, Jr. | 174/357 |
| 4,399,317 A | * | 8/1983 | Van Dyk, Jr. | 174/364 |
| 5,225,631 A | * | 7/1993 | Lee et al. | 277/646 |
| 5,353,695 A | * | 10/1994 | Ledet | 99/443 C |
| 2005/0039936 A1 | * | 2/2005 | Hikita et al. | 174/35 R |
| 2005/0061526 A1 | * | 3/2005 | Hensley et al. | 174/35 GC |

* cited by examiner

*Primary Examiner*—Hung V Ngo
(74) *Attorney, Agent, or Firm*—Bockhop & Associates LLC

(57) ABSTRACT

A gasket for shielding a seam between two surfaces includes a resilient member, a first electrode, a second electrode and a conductive layer. The resilient member has a first side and an opposite second side. The first electrode is disposed on the first side of the resilient member. The second electrode is disposed on the second side of the resilient member. The conductive layer envelops at least a portion of the resilient member, the first electrode and the second electrode. The resilient member includes a material that is compressed when a first potential is applied between the first electrode and the second electrode and that is decompressed when a second potential, different from the first potential, is applied between the first electrode and the second electrode.

17 Claims, 2 Drawing Sheets

ELECTROACTIVE POLYMER COMPRESSED GASKET FOR ELECTROMAGNETIC SHIELDING

CROSS REFERENCE TO A RELATED APPLICATION

This application is a continuation of and claims the benefit U.S. patent application Ser. No. 11/470,828, filed Sep. 7, 2006, the entirety of which is hereby incorporated by reference.

BACKGROUND OF THE INVENTION

1. Field of the Invention

The present invention relates to electronics enclosures and, more specifically, to a compressible conductive gasket used in electromagnetic shielding of an enclosure.

2. Description of the Prior Art

Complex electronic circuits, especially those used in medical and military applications, can be susceptible to interference from ambient electromagnetic radiation, referred to as electromagnetic interference (EMI). EMI can lead to incorrect results and equipment failure. Also, certain regulatory bodies, such as the FCC, limit the level of EMI that electronics devices can emit.

One method of shielding circuits from EMI and limiting the amount of EMI emitted by electronic devices is to place the device in a conductive enclosure. Since electromagnetic radiation will not propagate through a conductor, the shielded enclosure acts as a barrier to EMI. However, many enclosures include access doors that do not provide a complete conductive seal along the door edges. A significant amount of EMI can pass through gaps along door edges. To limit EMI passing through such gaps, door edges may be fitted with conductive gaskets.

In use with highly sensitive circuits, the conductive gaskets can include inflatable bladders (either pneumatic or hydraulic) that run along the length of the gasket. The inflatable bladders are used to provide sufficient compression to the gasket. To secure an access door, a technician deflates the gasket, secures the door and then re-inflates the gasket, usually using a removable pump. Such gaskets have several disadvantages. For example, a leak may form if the gasket is damaged or degraded. Such a leak will bleed off pressure, compromising the shielding effectiveness of the gasket. Also, inflatable gaskets require technicians to have gasket pumps available to inflate the gaskets.

Therefore, there is a need for a conductive gasket that provides comprehensive shielding with a high level of compression.

There is also a need for a conductive gasket that will maintain its shielding, even when degraded.

There is also a need for a conductive gasket that may be expanded without requiring an external pump.

SUMMARY OF THE INVENTION

The disadvantages of the prior art are overcome by the present invention which, in one aspect, is a gasket for shielding a seam between two surfaces that includes a resilient member, a first electrode, a second electrode and a conductive layer. The resilient member has a first side and an opposite second side. The first electrode is disposed on the first side of the resilient member. The second electrode is disposed on the second side of the resilient member. The conductive layer envelops at least a portion of the resilient member, the first electrode and the second electrode. The resilient member includes a material that is compressed when a first potential is applied between the first electrode and the second electrode and that is decompressed when a second potential, different from the first potential, is applied between the first electrode and the second electrode.

In another aspect, the invention is a gasket for electromagnetic shielding that includes an elongated electroactive polymer member. The elongated electroactive polymer member includes a first electrode and a spaced-apart second electrode. An elongated insulating sheath surrounds the elongated electroactive polymer member. A conductive layer is disposed about the elongated insulating sheath.

In yet another aspect, the invention is a method of shielding a seam between a first mating surface and a second mating surface of an electronics enclosure, in which an electroactive polymer gasket, having two activation electrodes, is placed between the first mating surface and the second mating surface while applying a first potential between the two activation electrodes. The first potential causes a portion of the electroactive polymer gasket to be in a compressed state. The first mating surface is fixed in a predetermined relationship with the second mating surface. A second potential, different from the first potential, is applied to the two activation electrodes. The second potential causes the portion of the electroactive polymer gasket to be in a decompressed state.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
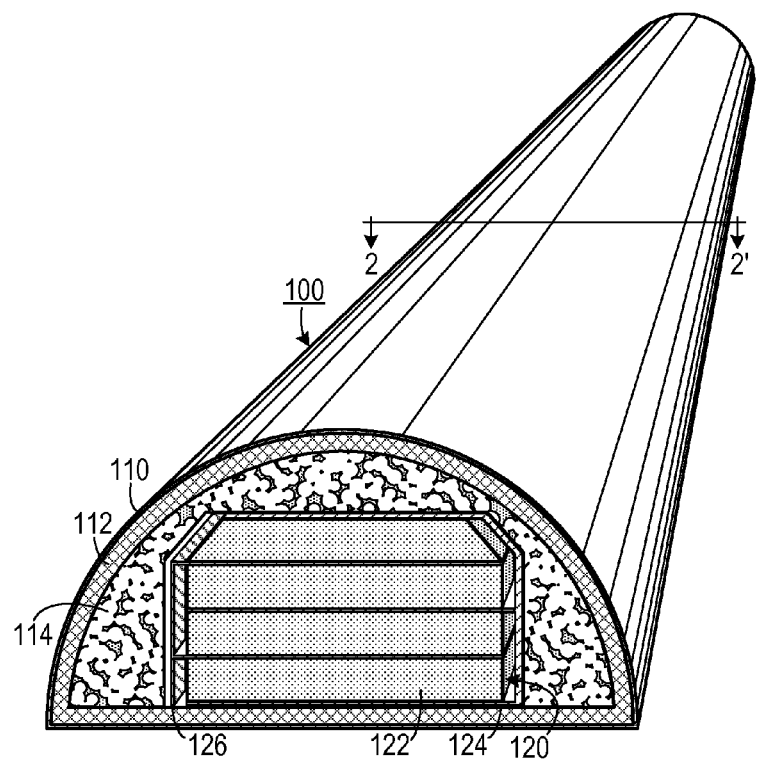
FIG. 1 is a perspective view of one embodiment of a gasket employing an electroactive polymer.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, one embodiment of a conductive shielding gasket 100 includes a resilient member 120, which could include one or more layers of an electroactive polymer 122. (The embodiment shown can be thought of as a stack of four resilient members. However, a single layer or many layers could be employed.) A first electrode 124 is disposed about at least one side of the resilient member 120 and a second electrode 126 is disposed in a spaced-apart relationship relative to the first electrode 124. An electroactive polymer is a polymer in which applying a voltage potential thereto modifies the shape of the polymer. One type of electroactive polymer will compress when a potential is applied across the polymer and expand when the potential is removed. One example of a suitable electroactive polymer is an electrostatic silicone elastomer.

A foam member 114 surrounds at least part of the resilient member 120 and an insulating sheath 112 surrounds the foam member 114. A conductive layer 110 envelops the insulating sheath 112. The conductive layer could include, for example, a metallized conductive film, such as a polyester film (e.g., a Mylar film) or a braided conductor. While multiple layers of electroactive polymer 122 in resilient member 120 are shown in the embodiment of FIG. 1, it is understood that in certain applications a single layer embodiment may be used. However, the stacked embodiment shown may allow increased compression over that of a single layer embodiment.

Figure 2A:
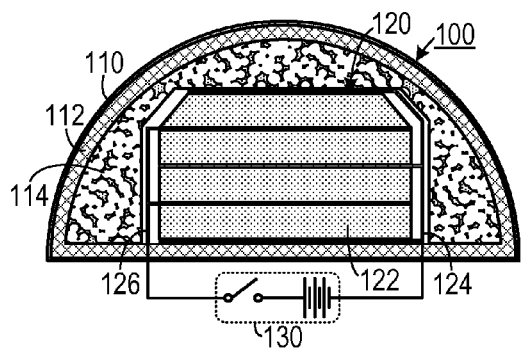
FIG. 2A is a cross-sectional view of the embodiment shown in FIG. 1, taken along line 2-2'.
Figure 2B:
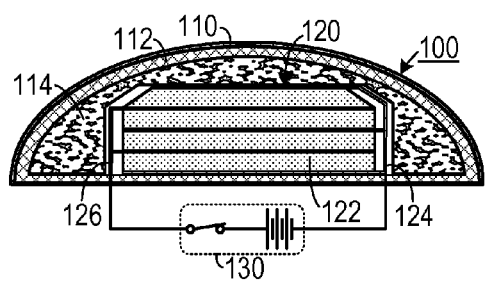
FIG. 2B is a cross-sectional view of the embodiment shown in FIG. 2A in a compressed state.

As shown in FIGS. 2A-2B, an activator circuit 130 can selectively apply a potential between the first electrode 124 and the second electrode 126. When no potential is applied, the electroactive polymer 122 is in a decompressed state, as shown in FIG. 2A, causing the gasket 100 to be expanded. When a potential is applied, the electroactive polymer 122 is in a compressed state, as shown in FIG. 2B, causing the gasket 100 also to be compressed. In certain embodiments, it might be advisable to apply a second, non-zero, potential to the electroactive polymer to maintain it in a maximally decompressed state. The gasket 100, in the decompressed state, is capable of exerting a force on whatever the gasket 100 is placed between (as described in more detail with reference to FIGS. 3A-3C) that is higher than could be implemented without a pre-compressed gasket, thereby ensuring better shielding. In one embodiment, the activator circuit 130 could include a micro-switch that is activated by a door of an enclosure so that the gasket 100 decompresses each time the door is opened and re-compresses each time it is closed.

Figures 3A, 3B:
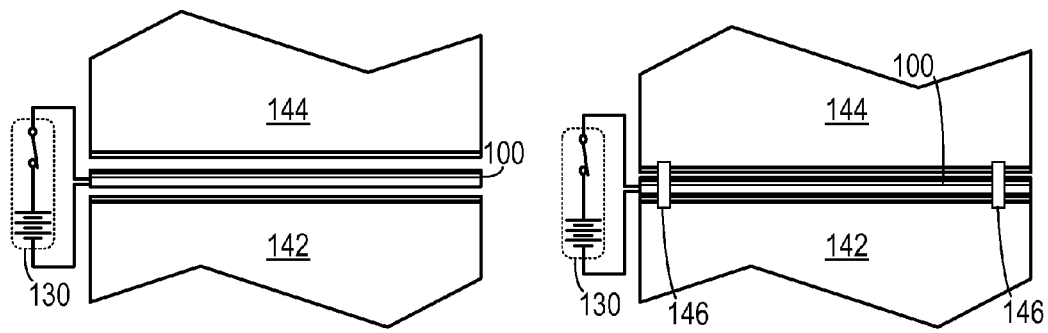
FIG. 3A-C are plan views of a gasket being applied to a seam of an enclosure.
Figure 3C:
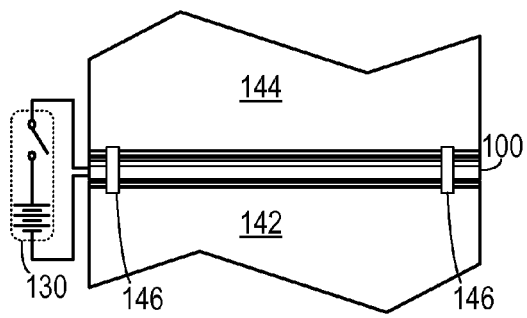

In one method of using the gasket 100, as shown in FIGS. 3A-3C, the gasket 100 is initially compressed by applying a potential between the electrodes, as shown in FIG. 3A. When the resilient member 120 (shown in FIG. 1 and FIGS. 2A-2B) is compressed, the gasket 100 may be slid into position or assembled without undue shear stress on the gasket 100. While the potential is still being applied, the first part of the enclosure 142 and the second part of the enclosure 144 are brought together with the gasket 100 placed in the seam between the two parts. The first part 142 is secured to the second part 144 with one or more fasteners 146 (e.g., a screw, a clip, etc.), as shown in FIG. 3B. Once secured, the potential is removed, and the gasket 100 expands, as shown in FIG. 3C.

Figure 4:
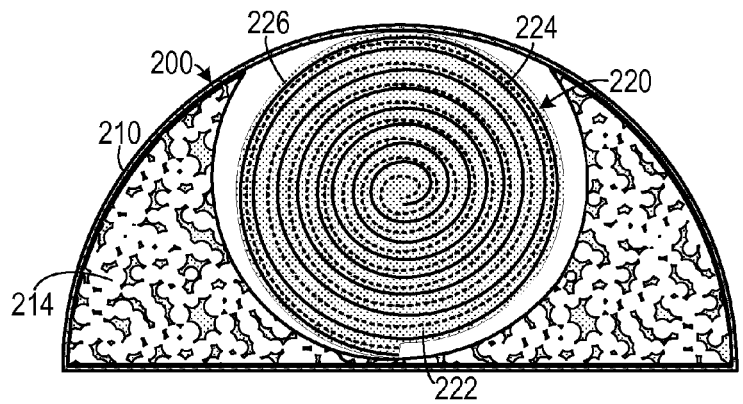
FIG. 4 is a cross-sectional view of an embodiment of a gasket employing a polymer roll.

An alternative embodiment of a gasket 200 is shown in FIG. 4, in which the electroactive polymer 222 is layered between the first electrode 224 and the second electrode 226 and then rolled up into a spiral resilient member 220. The spiral resilient member 220 may be surrounded by foam 214 and then enveloped with a conductive layer 210.

In one embodiment, the electroactive polymer is in a foam state so that no surrounding foam is necessary. In another embodiment, the resilient member does not include electroactive polymer, but uses a material that is compressed by the electrodes as a result of attractive forces between the electrodes resulting from the application of a potential.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A gasket for shielding a seam between two surfaces, comprising:
    a. a resilient member having a first side and an opposite second side;
    b. a first electrode disposed on the first side of the resilient member;
    c. a second electrode disposed on the second side of the resilient member; and
    d. a conductive layer enveloping at least a portion of the resilient member, the first electrode and the second electrode,
        the resilient member including a material that is compressed when a first potential is applied between the first electrode and the second electrode and that is decompressed when a second potential, different from the first potential, is applied between the first electrode and the second electrode.

2. The gasket of claim 1, further comprising an elongated insulating sheath surrounding at least a portion of the resilient member, the first electrode and the second electrode and enveloped by the conductive layer.

3. The gasket of claim 1, wherein the second potential is zero volts.

4. The gasket of claim 1, further comprising an activator circuit that is configured to apply selectively the first potential between the first electrode and the second electrode.

5. The gasket of claim 1, wherein the conductive layer comprises a conductive film.

6. The gasket of claim 1, wherein the conductive layer comprises a braid of conductive wires.

7. The gasket of claim 1, wherein the resilient member comprises an electroactive polymer.

8. The gasket of claim 7, wherein the electroactive polymer comprises an electrostatic silicone elastomer.

9. A gasket for electromagnetic shielding, comprising:
    a. an elongated electroactive polymer member that includes a first electrode and a spaced-apart second electrode;
    b. an elongated insulating sheath surrounding the elongated electroactive polymer member; and
    c. a conductive layer disposed about the elongated insulating sheath.

10. The gasket of claim 9, further comprising an activator circuit that is configured to apply selectively a potential between the first electrode and the second electrode.

11. The gasket of claim 10, wherein when the activator circuit applies a first potential to the elongated electroactive polymer member, the elongated electroactive polymer member is in a compressed state and wherein when the activator circuit applies a second potential, different from the first potential, to the elongated electroactive polymer member, the elongated electroactive polymer member is in a decompressed state.

12. The gasket of claim 11, wherein the second potential is zero volts.

13. The gasket of claim 9, further comprising an elongated foam layer disposed between a portion of the elongated electroactive polymer member and a portion of the elongated insulating sheath.

14. The gasket of claim 9, wherein the elongated electroactive polymer member comprises an electrostatic silicone elastomer.

15. The gasket of claim 9, wherein the conductive layer comprises a conductive film.

16. The gasket of claim 15, wherein the conductive film comprises:
    a. a polyester film; and
    b. a conductive material.

17. The gasket of claim 9, wherein the conductive layer comprises a braid of conductive wires.

* * * * *